(12) United States Patent
Li et al.

(10) Patent No.: US 8,186,822 B2
(45) Date of Patent: May 29, 2012

(54) INKJET INKS CONTAINING CROSSLINKED POLYURETHANES

(75) Inventors: Xiaoqing Li, Newark, DE (US); Charles T. Berge, Greenville, DE (US)

(73) Assignee: E I du Pont de Nemours and Company, Wilmington, DE (US)

(*) Notice: Subject to any disclaimer, the term of this patent is extended or adjusted under 35 U.S.C. 154(b) by 147 days.

(21) Appl. No.: 12/933,735

(22) PCT Filed: May 8, 2009

(86) PCT No.: PCT/US2009/043248
§ 371 (c)(1),
(2), (4) Date: Sep. 21, 2010

(87) PCT Pub. No.: WO2009/137747
PCT Pub. Date: Nov. 12, 2009

(65) Prior Publication Data
US 2011/0018928 A1    Jan. 27, 2011

Related U.S. Application Data

(60) Provisional application No. 61/126,872, filed on May 8, 2008.

(51) Int. Cl.
*B41J 11/00* (2006.01)
(52) U.S. Cl. .......................................... 347/100; 347/20
(58) Field of Classification Search .................. 347/20, 347/56, 95, 100; 106/31.13, 31.6, 31.27; 523/160, 161
See application file for complete search history.

(56) References Cited

U.S. PATENT DOCUMENTS

| | | | |
|---|---|---|---|
| 2,439,442 A | | 2/1943 | Amon et al. |
| 3,279,935 A | | 10/1966 | Daniell et al. |
| 3,023,118 A | | 2/1967 | Donnet |
| 3,347,632 A | | 10/1967 | Parker |
| 3,479,310 A | | 11/1969 | Dieterich et al. |
| 4,108,814 A | | 8/1978 | Reiff et al. |
| 4,269,748 A | | 5/1981 | Nachtkemp et al. |
| 4,408,008 A | | 10/1983 | Markusch |
| 4,829,122 A | | 5/1989 | Pedain et al. |
| 5,085,698 A | | 2/1992 | Ma et al. |
| 5,231,131 A | | 7/1993 | Chu et al. |
| 5,272,201 A | | 12/1993 | Ma et al. |
| 5,554,739 A | | 9/1996 | Belmont |
| 5,700,851 A | * | 12/1997 | Banning et al. ............... 523/161 |
| 5,990,245 A | | 11/1999 | Esselborn et al. |
| 6,117,921 A | | 9/2000 | Ma et al. |
| 6,248,839 B1 | | 6/2001 | Esselborn et al. |
| 6,262,152 B1 | | 7/2001 | Fryd et al. |
| 6,306,994 B1 | | 10/2001 | Donald et al. |
| 6,433,117 B1 | | 8/2002 | Ma et al. |
| 6,852,156 B2 | | 2/2005 | Yeh et al. |
| 7,074,850 B2 | * | 7/2006 | Hees et al. ..................... 524/590 |
| 2003/0128246 A1 | | 7/2003 | Redding et al. |
| 2003/0160851 A1 | | 8/2003 | Baccay et al. |
| 2005/0182154 A1 | | 8/2005 | Berge et al. |

FOREIGN PATENT DOCUMENTS

EP          0556649         2/1993

\* cited by examiner

*Primary Examiner* — Juanita D Jackson
(74) *Attorney, Agent, or Firm* — Dennis G. Morrell; John H. Laming

(57) ABSTRACT

Inkjet inks that have, as a principal component, a crosslinked polyurethane dispersoid binder additive with selected diols used to prepare the polyurethane. The diols include a polyether diol, an ionic diol and polycarbonate, polyamide and/or poly(meth)acrylate diols. These inks can be used for printing on different media, and are particularly suitable for printing on textiles. The printed textiles are particularly durable to wash fastness and crock.

15 Claims, No Drawings

INKJET INKS CONTAINING CROSSLINKED POLYURETHANES

CROSS-REFERENCE TO RELATED APPLICATION

This application claims priority under 35 U.S.C. §119 from U.S. Provisional Application Ser. No. 61/126,872, filed Mar. 8, 2008.

BACKGROUND OF THE INVENTION

This invention pertains to aqueous inkjet inks, more specifically to pigmented inkjet inks containing one or more crosslinked polyurethane dispersoid binders produced from specific diols. These binders are particularly suitable for use in textile printing inks. These inks are advantageous because printed textiles made with these inks have improved washfastness and colorfastness. These binders also have improved hydrolytic stability and consequently inks utilizing these binders have improved storage stability.

Suitable digital printing systems for textiles are disclosed in the art, for example, in commonly owned US20030128246 and US20030160851. Even as inkjet hardware improvements are made to increase printing speeds, adoption of inkjet printing in the textile industry will be impeded if methods to also improve colorfastness are not found.

A disadvantage of inkjet printing, in particular inkjet printing with pigmented ink, is inkjet printed fabrics are particularly susceptible to color removal by abrasion and thus have poor durability. Furthermore, another disadvantage of inkjet printing, in particular inkjet printing with pigmented ink, is that inkjet printed fabrics do not tolerate washing conditions required for textiles. The printed colors both fade upon washing and during the wash the colors can be undesirably transferred to other fabrics in the wash or to the washing machine parts. Furthermore, inks made for commercial consumption must withstand extended periods of storage conditions. The inks cannot degrade either in ink properties or the properties of the resultant print.

Therefore, there is need for improved ink stability, as well as improved durability of inkjet images on textile, especially in cases where the colorant is pigment. It is thus an object of this invention to provide inkjet inks with improved storage stability and inkjet printed textiles with improved durability and colorfastness especially as a result of laundering.

SUMMARY OF THE INVENTION

In an embodiment of the invention, stability of ink and the washfastness of an inkjet printed textile can be improved to a commercially acceptable level by using a first crosslinked polyurethane dispersoid binder in aqueous inkjet inks where the first crosslinked polyurethane has an isocyanate reactive portion comprising a mixture of diols $Z_1$, $Z_2$ and $Z_3$ (see below) or a physical mixture of at least a second and a third crosslinked polyurethane dispersoids where an isocyanate reactive portion of the second polyurethane comprises a mixture of the diols $Z_1$, and $Z_2$ and an isocyanate reactive portion of the third polyurethane comprises a mixture of the diols $Z_2$ and $Z_3$.

Each of the aforementioned crosslinked polyurethane dispersoids preferably satisfy the condition that the amount of crosslinking in the crosslinked polyurethanes is greater than about 1% and less than about 50 wt % as measured by the THF insolubles test.

In one aspect of the present invention, there is provided an inkjet ink composition comprising an aqueous vehicle having a colorant and a first crosslinked polyurethane dispersoid, wherein the ink comprises the first crosslinked polyurethane dispersoid preferably in an amount greater than about 0.5% to about 30% by weight, based on the total weight of the ink, and wherein the amount of crosslinking in the first crosslinked polyurethane is greater than about 1% and less than about 50 wt % as measured by the THF insolubles test and where the first crosslinked polyurethane is formed from a first diol, $Z_1$ a second diol, $Z_2$ and a third diol $Z_3$ and where

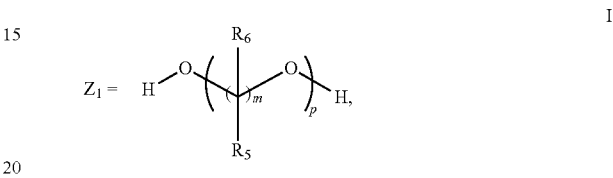

p greater than or equal to 2,
and m greater than or equal to 3 to about 36;
$R_5$, $R_6$=hydrogen, alkyl, substituted alkyl, aryl; where the $R_5$ or $R_6$ are the same or different for each substituted methylene group and where $R_5$ and $R_5$ or $R_6$ can be joined to form a cyclic structure;
$Z_2$ is a diol substituted with an ionic group;
$Z_3$ is selected from the group consisting of polycarbonate diols, polyamide diols and poly(meth)acrylate diols;
and where the colorant is selected from pigments and dyes or combinations of pigments and dyes.

In another embodiment, there is provided an inkjet ink composition comprising an aqueous vehicle having a colorant and a second crosslinked polyurethane dispersoid and a third crosslinked polyurethane dispersoid, wherein the ink comprises the second crosslinked polyurethane dispersoid preferably in an amount greater than about 0.25% to about 30% by weight and the third crosslinked polyurethane dispersoid preferably in an amount greater than about 0.5% to about 30% by weight based on the total weight of the ink, and wherein the amount of crosslinking in the second crosslinked polyurethane is greater than about 1% and less than about 50 wt % based on the THF insolubles test and the amount of crosslinking in the third crosslinked polyurethane is greater than about 1% and less than about 50 wt % based on the THF insolubles test and where the second crosslinked polyurethane is formed from a first diol, $Z_1$ and a second diol, $Z_2$ and the third crosslinked polyurethane is formed from a second diol, $Z_2$ and a third diol, $Z_3$ and where $Z_1$, $Z_2$ and $Z_3$ are as defined above, and the colorant is selected from pigments and dyes or combinations of pigments and dyes.

The instant invention is particularly advantageous for improving the durability of textiles printed with colorants in inkjet inks, and allows the achievement of commercially acceptable durability for inkjet ink printed textiles. In studies of the previously described, polyurethane binders (US2005/0182154) were shown to have poor storage stability, and when used after storage, produced poorer washfastness and crock. It is surprising that both the chemical combination of all 3 diols, $Z_1$, $Z_2$ and $Z_3$, in the polyurethane and the physical mixtures of the diols taken two at a time, $Z_1$ and $Z_2$ and $Z_2$ and $Z_3$ lead to the improved binder performance.

The present invention also provides aqueous dispersions, preferably colorant dispersions, which further contain dispersed crosslinked polyurethane dispersoid particles (as described above).

The invention also relates to a method of preparing the crosslinked polyurethane dispersoid (as set forth above). The first step in the preparation is preparing an aqueous dispersion of an aqueous crosslinked polyurethane dispersoid composition comprising the steps:

(a) providing reactants comprising (i) at least one diol $Z_3$ or $Z_1$ as defined above ii) at least one polyisocyanate component comprising a diisocyanate, and (iii) at least one hydrophilic reactant comprising at least one isocyanate reactive ingredient containing an ionic group, $Z_2$ as defined above;

(b) contacting (i), (ii) and (iii) in the presence of a water-miscible organic solvent to form an isocyanate-functional polyurethane prepolymer;

(c) adding water to form an aqueous dispersion; and (d) prior to, concurrently with or subsequent to step (c), providing a crosslinking component, chain extending, or chain-terminating the isocyanate-functional prepolymer with a primary or secondary amine.

The diol, diisocyanate and hydrophilic reactant may be added together in any order.

If the hydrophilic reactant contains ionizable groups then, at the time of addition of water (step (c)), the ionizable groups must be ionized by adding acid or base (depending on the type of ionizable group) in an amount such that the polyurethane can be stably dispersed.

Preferably, at some point during the reaction (generally after addition of water and after crosslinking, chain extension or chain termination.), the organic solvent is substantially removed under vacuum to produce an essentially solvent-free dispersion.

In a further aspect embodiment, there is provided an inkjet ink composition comprising an aqueous vehicle, a colorant and one or more crosslinked polyurethane dispersoid(s) that is/are formulated according to any of the specific diol combinations described above, wherein the colorant is soluble or dispersible in the aqueous vehicle, and wherein the weight ratio of the crosslinked polyurethane dispersoid(s) to colorant is at least about 0.2. The inkjet ink may optionally comprise other well-known additives is as required to obtain final desired properties of the ink or, in turn properties for the printed image.

The colorant in the inkjet ink preferably ranges from about 0.1 to about 30 wt %, based on the total weight of the ink, and is preferably a pigment. The crosslinked polyurethane dispersoid is preferably more than about 1% by weight, based on the total weight of the ink. When two or more crosslinked polyurethane dispersoids are used the amount of dispersoids is preferably more than about 1% by weight, based on the total weight of the ink. The amount of crosslinking in the crosslinked polyurethane(s) is preferably more than about 1 wt %, and less than about 50 wt % as measured by the THF insolubles test discussed in further detail below.

In accordance with another aspect embodiment, there is provided an inkjet ink set comprising at least three differently colored inkjet inks, wherein at least one of the inks is an inkjet ink as set forth above.

In yet another embodiment, there is provided a method for inkjet printing onto a substrate, comprising the steps of:

(a) providing an inkjet printer that is responsive to digital data signals;

(b) loading the printer with a substrate to be printed;

(c) loading the printer with an ink as set forth above and described in further detail below, or an inkjet ink set as set forth above and described in further detail below; and (d) printing onto the substrate using the ink or inkjet ink set in response to the digital data signals.

As indicated above, the inks and ink sets in accordance with the present invention are particularly useful as inkjet inks, more particularly as inkjet inks for textile printing. Preferred substrates, therefore, include textiles.

The printed textile can optionally be subject to a fusing process after printing. The fusing process requires exposing the printed textile to a combination of heat and pressure, which has been found to generally improve the durability of the textile, particularly when the colorant is a pigment. In particular, the post treatment combination of heat and pressure has been found to improve washfastness and stain rating.

Another aspect of the present invention is an inkjet printed textile inkjet printed with a pigmented inkjet ink, said printed textile having a wash fastness of at least 3 (as measured in accordance with AATCC Test Method 61-1996 as the 3A test) and a crock rating of at least 3.5 (as measured by AATCC Test Method Alternatively, the washfastness can be measured by comparing the color of the print after printing and then after 3 wash cycles.

These and other features and advantages of the present invention will be more readily understood by those of ordinary skill in the art from the following Detailed Description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination.

DETAILED DESCRIPTION

Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

The materials, methods, and examples herein are illustrative only and, except as specifically stated, are not intended to be limiting. Although methods and materials similar or equivalent to those described herein can be used in the practice or testing of the present invention, suitable methods and materials are described herein.

The aqueous inks comprise a colorant, a crosslinked polyurethane dispersoid binder and other ink components, wherein the colorant is soluble or dispersible in the aqueous vehicle.

In accordance with the present invention, the term "polyurethane dispersoid" refers to an aqueous dispersion/emulsion of a polymer containing urethane groups (e.g., polyurethane), as those terms are understood by persons of ordinary skill in the art. The aqueous crosslinked polyurethane dispersoid in accordance with the present invention comprises a crosslinked polyurethane, and thus is an aqueous stable polyurethane emulsion or dispersion in which the polyurethane contains some crosslinking. To distinguish the polyurethane dispersions/emulsion binders from the other dispersions and components in the inkjet ink, they are referred to herein as polyurethane "dispersoid(s)".

The crosslinked polyurethane dispersoid(s) is combined with the aqueous vehicle, colorant and other common ink jet components to produce a stable inkjet ink that can be used to print on all substrates. These inks are especially useful for textiles. The crosslinked polyurethane(s) preferably has had all of its crosslinking completed prior to its addition to the other inkjet ink components. The order of addition of the ink components can be in any convenient order.

While not being bound by theory it is believed that the combination of the polyetherdiol ($Z_1$) and the selected diols described by $Z_3$ provides a binder system for the inks that produce a significantly improved printing performance, especially for the demanding needs of textile printing. One of the surprising aspects is that both the chemical mixture where $Z_1$, $Z_2$ and $Z_3$ are each present as the isocyanate reactive components during the preparation of the crosslinked polyurethane and the physical mixture of the crosslinked polyurethane produced from the diols $Z_1$, and $Z_2$ and the crosslinked polyurethane produced from the diols $Z_2$ and $Z_3$ are equally capable of producing this improved result.

Examples of polyurethanes that can be used in the crosslinked polyurethane dispersoids are described below. As indicated above, the crosslinking of the polyurethanes is achieved prior to its addition to the ink system.

Colorants

Suitable colorants for the inks of this invention include soluble colorants such as dyes, and insoluble colorants such as dispersed pigments (pigment plus dispersing agent) and self-dispersing pigments.

Conventional dyes such as anionic, cationic, amphoteric and non-ionic dyes are useful in this invention. Such dyes are well known to those of ordinary skill in the art. Anionic dyes are those dyes that, in aqueous solution, yield colored anions. Cationic dyes are those dyes that, in aqueous solution, yield colored cations. Typically anionic dyes contain carboxylic or sulfonic acid groups as the ionic moiety. Cationic dyes usually contain quaternary nitrogen groups.

The types of anionic dyes most useful in this invention are, for example, Acid, Direct, Food, Mordant and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The types of cationic dyes that are most useful in this invention include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known to those skilled in the art.

Useful dyes include (cyan) Acid Blue 9 and Direct Blue 199; (magenta) Acid Red 52, Reactive Red 180, Acid Red 37, CI Reactive Red 23; and (yellow) Direct Yellow 86, Direct Yellow 132 and Acid Yellow 23.

Pigments suitable for use in the present invention are those generally well-known in the art for aqueous inkjet inks. Traditionally, pigments are stabilized by dispersing agents, such as polymeric dispersants or surfactants, to produce a stable dispersion of the pigment in the vehicle. More recently though, so-called "self-dispersible" or "self-dispersing" pigments (hereafter "SDP") have been developed. As the name would imply, SDPs are dispersible in water without dispersants. Dispersed dyes are also considered pigments as they are insoluble in the aqueous inks used herein.

Pigments that are stabilized by added dispersing agents may be prepared by methods known in the art. It is generally desirable to make the stabilized pigment in a concentrated form. The stabilized pigment is first prepared by premixing the selected pigment(s) and polymeric dispersant(s) in an aqueous carrier medium (such as water and, optionally, a water-miscible solvent), and then dispersing or defloccculating the pigment. The dispersing step may be accomplished in a 2-roll mill, media mill, a horizontal mini mill, a ball mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the polymeric dispersant and the pigment under pressure. After the milling process is complete the pigment concentrate may be "let down" into an aqueous system. "Let down" refers to the dilution of the concentrate with mixing or dispersing, the intensity of the mixing/dispersing normally being determined by trial and error using routine methodology, and often being dependent on the combination of the polymeric dispersant, solvent and pigment.

The dispersant used to stabilize the pigment is preferably a polymeric dispersant. Either structured or random polymers may be used, although structured polymers are preferred for use as dispersants for reasons well known in the art. The term "structured polymer" means polymers having a block, branched or graft structure. Examples of structured polymers include AB or BAB block copolymers such as those disclosed in U.S. Pat. No. 5,085,698; ABC block copolymers such as those disclosed in EP-A-0556649; and graft polymers such as those disclosed in U.S. Pat. No. 5,231,131. Other polymeric dispersants that can be used are described, for example, in U.S. Pat. Nos. 6,117,921, 6,262,152, 6,306,994, 6,433,117, and co-owned and co-pending U.S. Provisional Patent Application 61/005,977 (filed Dec. 10, 2007).

Polymer dispersants suitable for use in the present invention generally comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl(meth) acrylate may be employed.

A wide variety of organic and inorganic pigments, alone or in combination, may be selected to make the ink. The term "pigment" as used herein means an insoluble colorant. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Preferably, the pigment particle size should range from about 0.005 to about 5 micron and, most preferably, from about 0.005 to about 1 micron. The average particle size as measured by dynamic light scattering is preferably less than about 500 nm, more preferably less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form. Representative commercial dry pigments are listed in previously described U.S. Pat. No. 5,085,698.

In the case of organic pigments, the ink may contain up to about 30%, preferably about 0.1 to about 25%, and more preferably about 0.25 to about 10%, pigment by weight based on the total ink weight. If an inorganic pigment is selected, the ink will tend to contain higher weight percentages of pigment than with comparable inks employing organic pigment, and may be as high as about 75% in some cases, since inorganic pigments generally have higher specific gravities than organic pigments.

Self-dispersed pigments (SDPs) can be use with the crosslinked polyurethane dispersoids and are often advantageous over traditional dispersant-stabilized pigments from the standpoint of greater stability and lower viscosity at the same pigment loading. This can provide greater formulation latitude in final ink.

SDPs, and particularly self-dispersing carbon black pigments, are disclosed in, for example, U.S. Pat. Nos. 2,439,442, 3,023,118, 3,279,935 and 3,347,632. Additional disclosures of SDPs, methods of making SDPs and/or aqueous inkjet inks formulated with SDP's can be found in, for example, U.S. Pat. Nos. 5,554,739, 6,852,156. The preferred colorants are pigments, which include self-dispersed pigments.

Polyurethane Dispersoid Binders (PUDs)

As indicated above, a crosslinked polyurethane dispersoid refers to an aqueous dispersion of a polymer containing urethane groups and crosslinking, as those terms are understood by persons of ordinary skill in the art. These crosslinked polyurethane dispersoid require the presence of each of diols, $Z_1$, $Z_2$ and $Z_3$, in the polyurethane or physical mixtures of the diols taken two at a time, $Z_1$ and $Z_2$ and $Z_2$ and $Z_3$ in the polyurethane. It will be recognized that the crosslinked polyurethanes are prepared in a manner such that in the former case all three of the diols are present in the polyurethane, however there may be some that have only two of the three diols because of variability in the chemistries.

These polymers incorporate hydrophilic functionality to the extent required to maintain a stable dispersion of the polymer in water and, more preferably, the aqueous vehicle and the main source of the hydrophilic functionality is from the diol, $Z_2$. The main advantage of incorporating hydrophilic functionality into the polymer is that dispersion can be performed with minimal energy so that the dispersing processes do not require strong shear forces, resulting in finer particle size, better dispersion stability, and reduced water sensitivity of the polymers obtained after evaporation of the water. These polymers must incorporate ionic and may incorporate additional nonionic functionality to the extent required to maintain a stable dispersion of the polymer in water.

In general, the dispersion stability of the crosslinked polyurethane in the aqueous vehicle is achieved by incorporating ionic components in the polyurethane polymer, which facilitates stabilizing the crosslinked polyurethane in aqueous systems. This dispersion stability means the polyurethane will not phase separate, coagulate, and/or precipitate from the aqueous system.

Examples of suitable polyurethanes are those in which the polymer is predominantly stabilized in the dispersion through incorporated anionic functionality, and an example of this is anionic functionality such as neutralized acid groups ("anionically stabilized polyurethane dispersoid"). In general, the preferred anionic compound is the diol $Z_2$.

The diols, $Z_1$, $Z_2$ and $Z_3$, in the polyurethane or physical mixtures of the diols taken two at a time, $Z_1$ and $Z_2$ and $Z_2$ and $Z_3$ in the polyurethane provide polyurethane binders with improved hydrolytic stability. The improved hydrolytic stability is required because many polyurethanes hydrolyze in their own aqueous dispersion or in the ink which contains the polyurethane.

A way to measure this hydrolytic stability is to draw down a freshly made polyurethane into a film, dry the film, weigh a portion of the film which is suspended in an aqueous solution for a fixed time. After soaking in water the polyurethane is wiped dry and weighed; the weight gain is attributed to absorbed water. The change in weight is calculate and labeled as % water uptake. A comparison is made by doing the same steps with a polyurethane after it has been heated to 70° C. for 7 days. Improved inventive polyurethanes are characterized by showing similar or only modest water uptake of the as made polyurethane and the heat aged polyurethane.

Suitable aqueous polyurethane dispersoids are typically prepared by multi-step synthetic processes in which an NCO terminated prepolymer is formed, this prepolymer is added to water or water is added to the prepolymer forming a polymer dispersed in water (aqueous dispersion) and subsequently chain extended in the aqueous phase. The prepolymer can be formed by a single or multi-step process. Chain extension, if used, can also be a single or multi-step process. The important crosslinking can occur as part of these single or multi-step processes. It is preferred that the crosslinking for the polyurethane is completed prior to its addition to the ink formulation. The polyurethane synthesis and the crosslinking is completed prior to any mixing with other components and thus the colorants and the crosslinked polyurethane are completely independent.

After the polyurethane dispersoid is prepared it is included with the other ink components to produce the inkjet ink. The details of the preparation of the ink are familiar to those skilled in the art.

As indicated above, the polyurethane dispersoid is typically prepared by a multiple step process. Typically, in the first stage of prepolymer formation, a diisocyanate is reacted with a compound, polymer, or mixtures of compound, mixture of polymers or a mixture thereof, each containing two NCO-reactive groups. An additional compound or compounds, all containing $\geqq 2$ NCO-reactive groups as well as a stabilizing ionic functionality, is also used to form an intermediate polymer. This intermediate polymer or pre-polymer can be terminated with either an NCO-group or a NCO-reactive group. The terminal groups are defined by the molar ratio of NCO to NCO-reactive groups in the prepolymer stage. Typically, the pre-polymer is an NCO-terminated material that is achieved by using a molar excess of NCO. Thus, the molar ratio of diisocyanate to compounds containing two isocyanate-reactive groups is at least about 1.1:1.0, preferably about 1.20:1.0 to about 5.0:1.0, and more preferably about 1.20:1.0 to about 2.5:1.0. In general, the ratios are achieved by preparing, in a first stage, an NCO-terminated intermediate by reacting one of the NCO-reactive compounds, having at least 2 NCO reactive groups, with all or part of the diisocyanate. This is followed, in sequence, by additions of other NCO-reactive compounds, if desired. When all reactions are complete the group, NCO and/or NCO-reactive groups will be found at the termini of the pre-polymer. These components are reacted in amounts sufficient to provide a molar ratio such that the overall equivalent ratio of NCO groups to NCO-reactive groups is achieved.

The means to achieve the crosslinking of the polyurethane generally relies on at least one component of the polyurethane (starting material and/or intermediate) having 3 or more functional reaction sites. Reaction of each of the 3 (or more) reaction sites will produce a crosslinked polyurethane (3-dimensional matrix). When only two reactive sites are available on each reactive components, only linear (albeit possibly high molecular weight) polyurethanes can be produced. Examples of crosslinking techniques include but are not limited to the following:

the isocyanate-reactive moiety has at least 3 reactive groups, for example polyfunctional amines or polyol;

the isocyanate has at least 3 isocyanate groups;

the prepolymer chain has at least 3 reactive sites that can react via reactions other than the isocyanate reaction, for example with amino trialkoxysilanes;

addition of a reactive component with at least 3 reactive sites to the polyurethane prior to its use in the inkjet ink preparations, for example tri-functional epoxy crosslinkers;

addition of a water-dispersible crosslinker with oxazoline functionality;

synthesis of a polyurethane with carbonyl functionality, followed by addition of a dihydrazide compound;

and any combination of the these crosslinking methods and other crosslinking means known to those of ordinary skill in the relevant art.

Also, it is understood that these crosslinking components may only be a (small) fraction of the total reactive functionality added to the polyurethane. For example, when polyfunctional amines are added, mono- and difunctional amines may also be present for reaction with the isocyanates. The polyfunctional amine may be a minor portion of the amines.

The crosslinking preferably occurs during the preparation of the polyurethane. A preferred time for the crosslinking in the polyurethane reaction sequence would be just prior to, at, or after the time of the inversion step. That is, crosslinking preferably occurs during the addition of water to the polyurethane preparation mixture or shortly thereafter. The inversion is that point where sufficient water is added such that the polyurethane is converted to its stable dispersed aqueous form. Most preferred is that the crosslinking occurs after the inversion. Furthermore, all of the crosslinking of the polyurethane is preferably complete prior to its incorporation into the ink formulation.

Alternatively, the crosslinking can occur during the initial formation of the urethane bonds when the isocyanates or isocyanate-reactive groups have 3 or more groups capable of reacting. If the crosslinking is done at this early stage, the extent of crosslinking must not lead to gel formation. Too much crosslinking at this stage will prevent the formation of a stable polyurethane dispersion.

The amount of crosslinking of the polyurethane to achieve the desired inkjet ink for printing on different substrates can vary over a broad range. A preferred use of these inks is for the printing of textiles. While not being bound to theory, the amount of crosslinking is a function of the polyurethane composition, the whole sequence of reaction conditions utilized to form the polyurethane and other factors known to those of ordinary skill in the art. The extent of crosslinking, the inkjet ink formulation, the colorant, other inks in the inkjet set, the textile, the post treatment exposure to heat and/or pressure, and the printing technique for the textile, all contribute to the final printed textile performance. For the printing technique this can include pre and post treatment of the textile.

Based on techniques described herein, a person of ordinary skilled in the art is able to determine, via routine experimentation, the crosslinking needed for a particularly type of polyurethane to obtain an effective inkjet ink for textiles. Furthermore, as indicated above, these inks may also be used for plain paper, photo paper, transparencies, vinyl and other printable substrates.

The amount of crosslinking can be measured by a standard tetrahydrofuran insolubles test. For the purposes of definition herein, the tetrahydrofuran (THF) insolubles of the polyurethane dispersoid is measured by mixing 1 gram of the polyurethane dispersoid with 30 grams of THF in a pre-weighed centrifuge tube. After the solution is centrifuged for 2 hours at 17,000 rpm, the top liquid layer is poured out and the non-dissolved gel in the bottom is left. The centrifuge tube with the non-dissolved gel is re-weighed after the tube is put in the oven and dried for 2 hours at 110° C. The following equation is then used to calculate the result:

% THF insolubles of polyurethane=(weight of tube and non-dissolved gel−weight of tube)/(sample weight*polyurethane solid %). The % THF insolubles of polyurethane is reported as a weight percent based on the dry polymer.

The upper limit of crosslinking is related to the ability to make a stable aqueous polyurethane dispersion. If a highly crosslinked polyurethane has adequate ionic or non-ionic functionality such that it is a stable when inverted into water, then its level of crosslinking will lead to an improved inkjet ink for textiles. The upper limit of crosslinking as measured by the THF insolubles test is about 50% The lower limit of crosslinking in the polyurethane dispersoid is about 1% or greater, preferably about 2% or greater, as measured by the THF insolubles test.

Another way of measuring the insolubles derived from the crosslinking is to use swell ratio test that is used for testing coatings. The polyurethane dispersion is drawn down into film of defined thickness. Then a circular piece of the film is cut out and its dimensions observed. Then a drop of a solvent such as methylene chloride, THF is put on the piece of the film. Films with no crosslinking will likely dissolve under these conditions, and films with varying degrees of crosslinking can be correlated with dimensional changes.

An alternative way to achieve an effective amount of crosslinking in the polyurethane is to choose a polyurethane that has crosslinkable sites, then crosslink those sites via self-crosslinking and/or added crosslinking agents. Examples of self-crosslinking functionality includes, for example, silyl functionality (self-condensing) available from certain starting materials as indicated above, as well as combinations of reactive functionalities incorporated into the polyurethanes, such as epoxy/hydroxyl, epoxy/acid and isocyanate/hydroxyl. Examples of polyurethanes and complementary crosslinking agents include: (1) a polyurethane with isocyanate reactive sites (such as hydroxyl and/or amine groups) and an isocyanate crosslinking reactant, and (2) a polyurethane with unreacted isocyanate groups and an isocyanate-reactive crosslinking reactant (containing, for example, hydroxyl and/or amine groups). The complementary reactant can be added to the polyurethane, such that crosslinking is done prior to its incorporation into an ink formulation. The crosslinking should preferably be substantially completed prior to the incorporation of the dispersoid into the ink formulation. This crosslinked polyurethane preferably has from about 1% to about 50 crosslinking as measured by the THF insolubles test.

Combinations of two or more polyurethane crosslinked dispersoid binders may also be utilized in the formulation of the ink. Combinations of the second crosslinked dispersoid polyurethane with diols $Z_1$ and $Z_2$ and third crosslinked dispersoid polyurethanes with diols $Z_2$ and $Z_3$ are examples of the instant invention. The crosslinked polyurethane dispersoid can be mixed with other binders, including latexes, and the like. A non-limiting list of these binders includes dispersed acrylics, neoprenes, dispersed nylons, and non-crosslinked polyurethanes dispersions which would have no insoluble fraction as detected by the THF insolubles test.

The crosslinked polyurethane dispersoid contain diols where each of $Z_1$, $Z_2$ and $Z_3$, are present in the polyurethane or physical mixtures of the diols taken two at a time, $Z_1$ and $Z_2$ and $Z_2$ and $Z_3$ are present.

Diol $Z_1$ is a polyether diol shown in Structure (I) and are oligomers and polymers in which at least 50% of the repeating units have 3 to 36 methylene groups in the ether chemical groups. More preferably from about 75% to 100%, still more preferably from about 90% to 100%, and even more preferably from about 99% to 100%, of the repeating units are 3 to 36 methylene groups in the ether chemical groups (in Structure (I) m=3-36). The preferable number of methylene groups are from 3 to 12 and more preferably 3 or 4. The polyether diol shown in Structure (I) can be prepared by polycondensation of monomers comprising alpha, omega diols where m=3-36, thus resulting in polymers or copolymers containing the structural linkage shown above. As indicated above, at least 50% of the repeating units are 3 to 36 methylene ether units.

The oligomers and polymers based on the polyether diol shown in Structure (I), have from 2 to about 50 of the ether diol repeating groups shown in Structure (I); more preferable about 5 to about 20 of the ether diol repeating groups shown in Structure (I), where p denotes the number of repeating groups. In structure (I) $R_5$ and $R_6$ are hydrogen, alkyl, substituted alkyl, aryl; where the $R_5$ and $R_6$ are the same or different with each substituted methylene group and where $R_5$ and $R_6$ can be joined to form a cyclic structure. The substituted alkyl group preferably does not contain isocyanate reactive groups except as described below where a limited amount of trihydric alcohols can be allowed. In general, the substituted alkyls are intended to be inert during the polyurethane preparation.

In addition to the preferably 3 to 12 methylene ether units, lesser amounts of other units, such as other polyalkylene ether repeating units derived from ethylene oxide and propylene oxide may be present. The amount of the ethylene glycols and 1.2-propylene glycols which are derived from epoxides such as ethylene oxide, propylene oxide, butylene oxide, etc. are limited to less than 10% of the total polyether diol weight.

Diol $Z_3$ is selected from polycarbonate diols, polyamide diols and poly(meth) acrylate diols.

Polycarbonates containing hydroxyl groups include those known, per se, such as the products obtained from the reaction of diols such as propanediol-(1,3), butanediol-(1,4) and/or hexanediol-(1,6), diethylene glycol, triethylene glycol or tetraethylene glycol, higher polyether diols with phosgene, diarylcarbonates such as diphenylcarbonate, dialkylcarbonates such as diethylcarbonate or with cyclic carbonates such as ethylene or propylene carbonate.

Polycarbonate diols for blending are preferably selected from the group consisting of polyethylene carbonate diol, polytrimethylene carbonate diol, polybutylene carbonate diol and polyhexylene carbonate.

Polyamide polyols include those products obtained by reacting i) an organic compound selected from the group consisting of aromatic, aliphatic, and cycloaliphatic anhydrides and diacid halides, with ii) an amine containing compound including amino alcohols, diamines and mixtures thereof, The compound (i), used to form the polyamide is preferably a cycloaliphatic anhydride or a diacid halide. Examples of these include, but are not limited to 1,2-cyclohexane dicarboxylic anhydride, phthalic anhydride or succinic anhydride, or a diacid halide such as terephthaloyl chloride, succinyl chloride or adipoyl chloride. The amine containing compound (ii), used to form the polyamide includes primary and secondary amino alcohols, or diamines. Examples of suitable amino alcohols include, but are not limited to ethanolamine, propanol amine, 2-amino-2-methyl-1-propanol and diethanoi amine. Diamines include diaminocyclohexane and ethylene diamine.

The polyamide formed by the reaction of compounds (i) and (ii) is formulated to provide a polyamide having hydroxyl substituted reactive termini. If diamine is used as the amine containing compound, the product is subsequently reacted with excess amino alcohol to provide a polyamide substituted at its reactive termini with hydroxyl groups. Thiol terminated polyamides are prepared by the same process by substituting amino thiols for the amino alcohol.

Poly(meth)acrylates containing hydroxyl groups include those common in the art of addition polymerization such as cationic, anionic and radical polymerization and the like. Examples are alpha-omega diols. An example of these type of diols are those which are prepared by a "living" or "control" or chain transfer polymerization processes which enables the placement of one hydroxyl group at or near the termini of the polymer. U.S. Pat. Nos. 6,248,839 and 5,990,245 have examples of protocol for making terminal diols. Other di-NCO reactive poly(meth)acrylate terminal polymers can be used. An example would be end groups other than hydroxyl such as amino or thiol, and may also include mixed end groups with hydroxyl.

Diol, $Z_2$ is an isocyanate-reactive compound containing ionic (i.e., ionizable) groups. For example, anionic and cationic groups can be chemically incorporated into the polyurethane to provide hydrophilicity and enable the polyurethane to be dispersed in an aqueous medium.

Examples of ionic dispersing groups include carboxylate groups (—COOM), phosphate groups (—OPO$_3$ M$_2$), phosphonate groups (—PO$_3$ M$_2$), sulfonate groups (—SO$_3$ M), quaternary ammonium groups (—NR$_3$ Y, wherein Y is a monovalent anion such as chlorine or hydroxyl), or any other effective ionic group. M is a cation such as a monovalent metal ion (e.g., Na$^+$, K$^+$, Li$^+$, etc.), H$^+$, NR$_4^+$, and each R can be independently an alkyl, aralkyl, aryl, or hydrogen. These ionic dispersing groups are typically located pendant from the polyurethane backbone.

In the case of anionic group substitution, the groups can be carboxylic acid groups, carboxylate groups, sulphonic acid groups, sulphonate groups, phosphoric acid groups and phosphonate groups, The acid salts are formed by neutralizing the corresponding acid groups either prior to, during or after formation of the NCO prepolymer, preferably after formation of the NCO prepolymer.

Suitable compounds for incorporating carboxyl groups are described in U.S. Pat. Nos. 3,479,310, 4,108,814 and 4,408, 008. The neutralizing agents for converting the carboxylic acid groups to carboxylate salt groups are described in the preceding publications, and are also discussed hereinafter. Within the context of this invention, the term "neutralizing agents" is meant to embrace all types of agents that are useful for converting carboxylic acid groups to the more hydrophilic carboxylate salt groups. In like manner, sulphonic acid groups, sulphonate groups, phosphoric acid groups, and phosphonate groups can be neutralized with similar compounds to their more hydrophilic salt form.

Examples of carboxylic group-containing compounds are the hydroxy-carboxylic acids corresponding to the formula (HO)xQ(COOH)y wherein Q represents a straight or branched, hydrocarbon radical containing 1 to 12 carbon atoms, x is 1 or 2 (preferably 2), and y is 1 to 3 (preferably 1 or 2).

Examples of these hydroxy-carboxylic acids include citric acid, tartaric acid and hydroxypivalic acid.

Especially preferred acids are those of the above-mentioned formula wherein x=2 and y=1. These dihydroxy alkanoic acids are described in U.S. Pat. No. 3,412,054. Especially preferred dihydroxy alkanoic acids are the alpha,alpha-dimethylol alkanoic acids represented by the structural formula:

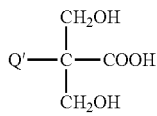

wherein Q' is hydrogen or an alkyl group containing 1 to 8 carbon atoms. The most preferred compound is alpha,alpha-dimethylol propionic acid, i.e., wherein Q' is methyl in the above formula.

When the ionic stabilizing groups are acids, the acid groups are incorporated in an amount sufficient to provide an acid group content, known by those skilled in the art as acid number (mg KOH per gram solid polymer), of at least about 5, preferably at least about 10 milligrams KOH per 1.0 gram of polyurethane. The upper limit for the acid number (AN) is about 50, preferably about 40.

For the first crosslinked polyurethane where $Z_1$, $Z_2$, and $Z_3$ are each present, the molar amount of $Z_2$ must be sufficient to provide the dispersion stability as described above. In addition, $Z_1$, and $Z_3$ should be present in the mole ratio of about 1:1 to about 1:10, preferably about 1:1.5 to about 1:7.

For the case where the second and third crosslinked polyurethane are present, the molar amount of $Z_2$ must be sufficient to provide the dispersion stability as described above. In addition, $Z_1$, of the second crosslinked polyurethane and $Z_3$ third crosslinked polyurethane should be present in the mole ratio of about 1:1 to about 1:10, preferably about 1:1.5 to about 1:7.

The preferred ratios of $Z_1$, $Z_2$, and $Z_3$ are chosen to obtain the desired improved hydrolysis stability of the polyurethanes, improved washfastness, while preserving other attributes such as hand, crock of the printed textiles.

Suitable diisocyanates are those that contain either aromatic, cycloaliphatic or aliphatic groups bound to the isocyanate groups. Mixtures of these compounds may also be used. The preferred is a prepolymer that has isocyanates bound to a cycloaliphatic or aliphatic moieties. If aromatic diisocyanates are used, cycloaliphatic or aliphatic isocyanates are preferably present as well.

Examples of suitable diisocyanates include cyclohexane-1,3- and -1,4-diisocyanate; 1-isocyanato-3-isocyanatomethyl-3,5,5-trimethyl -cyclohexane(isophorone diisocyanate or IPDI); bis-(4-isocyanatocyclohexyl)-methane; 1,3- and 1,4-bis-(isocyanatomethyl)-cyclohexane; 1-isocyanato-2-isocyanatomethyl cyclopentane; 2,4'-diisocyanato-dicyclohexyl methane; bis-(4-isocyanato-3-methyl -cyclohexyl)-methane, alpha,alpha,alpha',alpha'-tetramethyl-1,3- and/or -1,4-xylylene diisocyanate; 1-isocyanato-1-methyl-4(3)-isocyanatomethyl cyclohexane; and 2,4- and/or 2,6-hexahydrotoluylene diisocyanate.

Additional diisocyanates may be linear or branched and contain 4 to 12 carbon atoms, preferably 4 to 9 carbon which include 1,4-tetramethylene diisocyanate; 1,6-hexamethylene diisocyanate; 2,2,4-trimethyl-1,6-hexamethylene diisocyanate; and 1,12-dodecamethylene diisocyanate. 1,6-hexamethylene diisocyanate and isophorone diisocyanate are examples of diisocyanates effective for the crosslinked polyurethanes In addition to the above-mentioned components, which are preferably difunctional in the isocyanate polyaddition reaction, mono-functional and even small portions of trifunctional and higher functional components generally known in polyurethane chemistry, such as trimethylolpropane or 4-isocyanantomethyl-1,8-octamethylene diisocyanate, may be used in cases in which branching of the NCO prepolymer or polyurethane is desired. However, the NCO prepolymers should be substantially linear and this may be achieved by maintaining the average functionality of the prepolymer starting components at or below 2:1.

Process conditions for preparing the preferred NCO containing prepolymers have been discussed in the publications previously noted. The finished NCO containing prepolymer should have a isocyanate content of about 1 to about 20%, preferably about 1 to about 10% by weight, based on the weight of prepolymer solids.

The crosslinked polyurethanes dispersoids are typical prepared by chain extending these NCO containing prepolymers. Chain extenders are polyamine chain extenders, which can optionally be partially or wholly blocked as disclosed in U.S. Pat. Nos. 4,269,748 and 4,829,122. These publications disclose the preparation of aqueous polyurethane dispersoids by mixing NCO-containing prepolymers with at least partially blocked, diamine or hydrazine chain extenders in the absence of water and then adding the mixture to water. Upon contact with water the blocking agent is released and the resulting unblocked polyamine reacts with the NCO containing prepolymer to form the polyurethane.

Suitable blocked amines and hydrazines include the reaction products of polyamines with ketones and aldehydes to form ketimines and aldimines, and the reaction of hydrazine with ketones and aldehydes to form ketazines, aldazines, ketone hydrazones and aldehyde hydrazones. The at least partially blocked polyamines contain at most one primary or secondary amino group and at least one blocked primary or secondary amino group which releases a free primary or secondary amino group in the presence of water.

Suitable polyamines for preparing the at least partially blocked polyamines have an average functionality, i.e., the number of amine nitrogens per molecule, of 2 to 6, preferably 2 to 4 and more preferably 2 to 3. The desired functionalities can be obtained by using mixtures of polyamines containing primary or secondary amino groups. The polyamines are generally aromatic, aliphatic or alicyclic amines and contain between 1 to 30, preferably 2 to 15 and more preferably 2 to 10 carbon atoms. These polyamines may contain additional substituents provided that they are not as reactive with isocyanate groups as the primary or secondary amines. These same polyamines can be partially or wholly blocked polyamines.

A suitable method of chain extension is to add polyamine to the NCO-prepolymer before, during or after the pre-polymer inversion into water. Optionally, the chain extension can occur after pre-polymer inversion. The polyamines include 1-amino-3-aminomethyl-3,5,5- trimethylcyclohexane (isophorone diamine or IPDA), bis-(4-amino- cyclohexyl)-methane, bis-(4-amino-3-methylcyclohexyl)-methane, 1,6-diaminohexane, hydrazine, ethylene diamine, diethylene triamine, triethylene tetramine, tetraethylene pentamine and pentaethylene hexamine.

In some cases, chain termination may be desirable. This requires the addition, in most cases, of a mono-NCO reactive material such as a mono-amine or mono-alcohol. The materials can be added before, during or after inversion of the pre-polymer. Poly-NCO reactive materials can be used where one of the NCO-reactive groups reacts substantially faster than the others. Examples would be ethanol amine and diethanol amine. The amine group will react much faster with the NCO group than the alcohol.

Suitable chain terminators would be amines or alcohols having an average functionality per molecule of 1, i.e., the number of primary or secondary amine nitrogens or alcohol oxygens would average 1 per molecule. The desired functionalities can be obtained by using primary or secondary amino groups. The amines or alcohols are generally aromatic, aliphatic or alicyclic and contain between 1 to 30, preferably 2 to 15 and more preferably 2 to 10 carbon atoms. These may contain additional substituents provided that they are not as reactive with isocyanate groups as the amine or alcohol groups. Examples of chain terminators include dibutylamine, diethylamine, diisopropyle amine, bis (methoxyethyl) amine, and other amines.

Chain terminators and chain extenders can be used together, either as mixtures or as sequential additions to the NCO-prepolymer.

The amount of chain extender and/or chain terminator to be used in accordance with the present invention is dependent upon the number of isocyanate groups in the prepolymer. Preferably, the ratio of isocyanate groups of the prepolymer to isocyanate-reactive groups of the chain extender/terminator is between about 1.0:0.6 and about 1.0:1.1, more preferably between about 1.0:0.7 and about 1.0:1.1, on an equivalent basis. Any isocyanate groups that are not chain extended/terminated with an amine or alcohol will react with water, which functions as a chain extender.

Chain extension can take place prior to addition of water in the process, but typically takes place by combining the NCO containing prepolymer, chain extender, water and other optional components under agitation.

In order to have a stable dispersion, a sufficient amount of the ionic groups (if present) must be neutralized so that, when combined with the optional hydrophilic ethylene oxide and other alkenyl oxide units and optional external emulsifiers, the resulting polyurethane will remain stably dispersed in the aqueous medium. Generally, at least about 70%, preferably at least about 80%, of the acid groups are neutralized to the corresponding carboxylate salt groups. Alternatively, cationic groups in the polyurethane can be quaternary ammonium groups (-NR3Y, wherein Y is a monovalent anion such as chlorine or hydroxyl).

Suitable neutralizing agents for converting the acid groups to salt groups include tertiary amines, alkali metal cations and ammonia. Examples of these neutralizing agents are disclosed in U.S. Pat. Nos. 4,701,480, as well as 4,501,852. Preferred neutralizing agents are the trialkyl-substituted tertiary amines, such as triethyl amine, tripropyl amine, dimethylcyclohexyl amine, and dimethylethyl amine. Substituted amines are also useful neutralizing groups such as diethyl ethanol amine or diethanol methyl amine.

Neutralization may take place at any point in the process. Typical procedures include at least some neutralization of the prepolymer, which is then chain extended/terminated in water in the presence of additional neutralizing agent.

The final product is a stable aqueous dispersoid of polyurethane particles having a dry polymer solids content of up to about 60% by weight, preferably about 15 to about 60% by weight and most preferably about 30 to about 40% by weight. The solid content is also called a solids basis. When the crosslinked polyurethane dispersoid amount is reported in the inks, it is reported as weight of the crosslinked polyurethane dispersoid as the dry polymer. If the polyurethane is the aqueous is weight 35% then an ink with 7% crosslinked polyurethane dispersoid binder (as the dry polymer solids) would have 20 parts by weight added of the aqueous crosslinked polyurethane dispersion. However, it is always possible to dilute the dispersions to any minimum solids content desired. The dispersion of crosslinked polyurethane dispersoid is an offwhite milky looking substance typical of these types of dispersions; there can be some yellowness which is likely developed from heating organic materials over extended time periods.

Other additives to the inkjet ink may be include post printing curing agents that can undergo post printing curing after the ink is formulated. This additional curing for the purposes of this application is called post printing curing at the time of the printing, or post treatment of the printed material. The crosslinking in the crosslinked polyurethane dispersoid as measured by the THF insolubles test is independent of any post curing. The crosslinked polyurethane dispersoid may or may not participate in the post printing curing.

Post printing curing agents if added to the ink will lead to an additional post printing curing treatment after the image is printed. This additional post printing curing is often facilitated by heating of the sample after it is printed. An example of a post printing curing agent would be the addition of a melamine to the ink. After printing the ink with the melamine, it would be heated to affect post printing curing at or to the substrate.

Example of suitable post printing curing agents include amide and amine-formaldehyde resin, phenolic resins, urea resins and blocked polyisocyanate. The selected post printing curing agent is soluble or dispersible in the ink. Inks contain the crosslinked hydrolytically stable polyurethane PUD binder and the selected post printing curing are stable in storage which means no curing reaction took place before printing. Only after the ink is printed and when the printed image is fused with heat and optionally pressure, the post printing curing undergoes chemical reaction with the one or more of the polyurethane dispersoid, dispersant, hydroxyl functional ink vehicle, the textile substrate, etc. Melamine-formaldehyde resin is preferred and an example of this is Cymel® 303 ULF, from Cytec, West Patterson N.J. The post printing curing agent loading in the ink could range from 0.2 to about 12%, preferably from about 1 to about 8%. And optionally 0.01% to 1% acid or acid blocked catalyst could be used to further increase post printing curing efficiency. An example of acid catalysts include Nacure® 3525 from King Industries, Norwalk Conn. An example of this is the addition of a melamine to the ink. After printing the ink with the melamine, it is heated to affect further post printing curing at or onto the substrate. Textiles are a preferred substrate for this post printing curing.

Aqueous Vehicle

"Aqueous vehicle" refers to water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698.

The aqueous inks of the present invention are comprised primarily of water. Thus, the instant inks comprise at least about 40%, preferably at least about 45%, and more preferably at least about 50% by weight of water, based on the total weight of the ink.

If a mixture of water and a water-soluble solvent is used, the aqueous vehicle typically will contain about 40% to about 95% by weight water with the balance (i.e., about 60% to about 5% by weight) being the water-soluble solvent. Preferred compositions contain about 65% to about 95% by weight water, based on the total weight of the aqueous vehicle.

The amount of aqueous vehicle in the ink is typically in the range of about 70% to about 99.8%, and preferably about 80% to about 99.8%, by weight based on total weight of the ink.

The aqueous vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-alkanediols are preferably 1,2-$C_{4-6}$ alkanediols, most preferably 1,2- hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, Pluronic® block copolymer surfactants, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink.

Surfactants may be used, typically in the amount of about 0.01 to about 5% and preferably about 0.1 to about 1%, based on the total weight of the ink.

In addition, solvents that are not water miscible may be added to the ink to facilitate the printing the ink which has a polyurethane dispersoid binder in it. While not being bound by theory, it is believed that this added non-aqueous solvent assists in the coalescence of the polyurethane onto the printed substrate, especially a fabric in the case of textile printing. Examples of these water-immiscible solvents are propylene carbonate and dipropylene glycol monomethyl ether.

Proportion of Main Ingredients

The colorant levels employed in the textile inks are those levels which are typically needed to impart the desired color density to the printed image. Typically, for the preferred colorant the pigment is present at a level of about 0.1% up to a level of about 30% by weight of the total weight of ink. Alternatively, the pigment can be about 0.25 to about 25% of the total weight of the ink. Further, the pigment can be about 0.25 to about 15% of the total weight of the ink.

The crosslinked polyurethane dispersoid level employed is dictated by the range of ink properties that can be tolerated. Generally, polyurethane levels will range up to about 30%, more particularly from about 1% up to about 25%, and typically about 4% to about 20%, by weight (polyurethane solids basis) of the total weight of ink. Effective levels of polyurethane are typically those where the weight ratio of polyurethane (solids) to colorant (pigment) is at least about 0.2, preferably more than about 0.75, alternatively more than about 1.0. This weight ratio must be balanced against other ink properties, such as viscosity, to maintain acceptable jetting performance. The right balance of properties must be determined for each circumstance, which can be done by the person of ordinary skill in the art using routine experimentation.

Other Ingredients

The inkjet ink may contain other ingredients as are well known in the art. For example, anionic, nonionic, cationic or amphoteric surfactants may be used. In aqueous inks, the surfactants are typically present in the amount of about 0.01 to about 5%, and preferably about 0.2 to about 2%, based on the total weight of the ink.

Co-solvents, such as those exemplified in U.S. Pat. No. 5,272,201 may be included to improve pluggage inhibition properties of the ink composition.

Biocides may be used to inhibit growth of microorganisms.

Sequestering agents such as EDTA may also be included to eliminate deleterious effects of heavy metal impurities.

Ink Properties

Jet velocity, separation length of the droplets, drop size and stream stability are greatly affected by the surface tension and the viscosity of the ink. Inkjet inks suitable for use with inkjet printing systems should have a surface tension in the range of about 20 dyne/cm to about 70 dyne/cm, more preferably about 25 to about 40 dyne/cm at 25° C. Viscosity is preferably in the range of about 1 cP to about 30 cP, more preferably about 2 to about 20 cP at 25° C. The ink has physical properties compatible with a wide range of ejecting conditions, i.e., driving frequency of the pen and the shape and size of the nozzle.

The inks should have excellent storage stability for long periods. Preferably, the instant inks can sustain elevated temperature in a closed container for extended periods (e.g. 70° C. for 7 days) without substantial increase in viscosity or particle size.

Further, the ink should not corrode parts of the inkjet printing device it comes in contact with, and it should be essentially odorless and non-toxic.

Inks of the instant invention can achieve the beneficial durable properties of washfastness.

Ink Sets

The ink sets in accordance with the present invention preferably comprise at least three differently colored inks (such as CMY), and preferably at least four differently colored inks (such as CMYK), wherein at least one of the inks is an aqueous inkjet ink comprising an aqueous vehicle, a colorant and a crosslinked polyurethane dispersoid(s), wherein the colorant is soluble or dispersible in the aqueous vehicle.

The ink set may further comprise one or more "gamut-expanding" inks, including different colored inks such as an orange ink, a green ink, a red ink and/or a blue ink, and combinations of full strength and light strengths inks such as light cyan and light magenta. These "gamut-expanding" inks are particularly useful in textile printing for simulating the color gamut of analog screen printing, such as disclosed in US20030128246.

Method of Printing

The inks and ink sets of the present invention can be by printing with any inkjet printer. The substrate can be any suitable substrate including plain paper (such as standard elecrophotographic papers), treated paper (such as coated papers like photographic papers), textile, and non-porous substrates including polymeric films such as polyvinyl chloride and polyester.

A particularly preferred use of the inks and ink sets of the present invention is in the inkjet printing of textiles. Textiles include but are not limited to cotton, wool, silk, nylon, polyester and the like, and blends thereof. The finished form of the textile includes, but is not limited to, fabrics, garments, t-shirts furnishings such as carpets and upholstery fabrics, and the like. Additionally, fibrous textile materials that come into consideration are especially hydroxyl-group-containing fibrous materials, including but not limited to natural fibrous materials such as cotton, linen and hemp, and regenerated fibrous materials such as viscose and lyocell. Further fibrous materials include wool, silk, polyvinyl, polyacrylonitrile, polyamide, aramide, polypropylene and polyurethane. The said fibrous materials are preferably in the form of sheet-form textile woven fabrics, knitted fabrics or webs.

Suitable commercially available inkjet printers designed for textile printing include, for example, DuPont® Artistri® 2020 and 3210 Textile Printers (E.I. du Pont de Nemours and Company, Wilmington, Del.), Textile Jet (Mimaki USA, Duluth, Ga.), DisplayMaker Fabrijet (MacDermid ColorSpan, Eden Prairie, Minn.), Amber, Zircon, and Amethyst (Stork®).

The printed textiles may optionally be post processed with heat and/or pressure, such as disclosed in US20030160851.

Upper temperature is dictated by the tolerance of the particular textile being printed. Lower temperature is determined by the amount of heat needed to achieve the desired level of durability. Generally, fusion temperatures will be at least about 80° C. and preferably at least about 140° C., more preferably at least about 160° C. and most preferably at least about 180° C.

Fusion pressures required to achieve improved durability can be very modest. Thus, pressures can be about 3 psig, preferably at least about 5 psig, more preferrable at least about 8 psig and most preferably at least about 10 psig. Fusion pressures of about 30 psi and above seem to provide no additional benefit to durability, but such pressures are not excluded.

The duration of fusion (amount of time the printed textile is under pressure at the desired temperature) is not believed to be particularly critical. Most of the time in the fusion operation generally involves bringing the print up to the desired temperature. Once the print is fully up to temperature, the time under pressure can be brief (seconds).

This invention is further illustrated, but not limited, by the following Examples.

EXAMPLES

Tests used to characterize the polyurethane dispersoids, the inks and the printed textiles were those commonly used in the art. Some specific procedures are listed Printing and Testing Techniques Inkjet printers used in the following examples were:

(1) a print system with a stationery print head mount with up to 8 print heads, and a media platen. The printheads were from Xaar (Cambridge, United Kingdom). The media platen held the applicable media and traveled underneath the print heads. The sample size was 7.6 cm by 19 cm. Unless otherwise noted this print system was used to print the test samples.

(2) Seiko IP-4010 printer configured to accept fabrics (3) DuPont® Artistri® 2020 printer.

The fabrics used were obtained from Testfabrics, Inc., (Pittston Pa.) namely: (1) 100% cotton fabric style #419W, which is a bleached, mercerized combed broadcloth (133× 72); (2) Polyester/cotton fabric style #7435M, which is a 65/35 poplin mercerized and bleached; and (3) Polyester fabric style 7436, which is a 65/35 poplin mercerized and bleached.

In some examples, the printed textile was fused at elevated temperature and pressure. Two different fusing apparatus were employed:

(1) a Glenro (Paterson, N.J.) Bondtex™ Fabric and Apparel Fusing Press which moves the printed fabric between two heated belts equipped with adjustable pneumatic press and finally through a nip roller assembly; and (2) a platen press, assembled for the purpose of precisely controlling temperature and pressure. The platen press was comprised of two parallel 6" square platens with embedded resistive heating elements that could be set to maintain a desired platen temperature. The platens were fixed in a mutually parallel position to a pneumatic press that could press the platens together at a desired pressure by means of adjustable air pressure. Care was taken to be sure the platens were aligned so as to apply equal pressure across the entire work piece being fused. The effective area of the platen could be reduced, as needed, by inserting a spacer (made, for example from silicone rubber) of appropriate dimensions to allow operation on smaller work pieces.

The standard temperature for the fusing step in the examples was 160° C. unless otherwise indicated.

The printed textiles were tested according to methods developed by the

American Association of Textile Chemists and Colorists, (AATCC), Research Triangle Park, N.C. The AATCC Test Method 61-1996, "Colorfastness to Laundering, Home and Commercial: Accelerated", was used. In that test, colorfastness is described as "the resistance of a material to change in any of its color characteristics, to transfer of its colorant(s) to adjacent materials or both as a result of the exposure of the material to any environment that might be encountered during the processing, testing, storage or use of the material." Test 3A was done and the color washfastness was recorded. The ratings for these tests are from 1-5 with 5 being the best result, that is, little or no loss of color.

Colorfastness to crocking was also determined by AATCC Crockmeter Method, AATCC Test Method 8-1996. The ratings for these tests were from 1-5 with 5 being the best result, that is, little or no loss of color and little or no transfer of color to another material, respectively. The results are rounded to the nearest 0.5, which was judged to be accuracy of the method.

The colorant dispersion, or other stable aqueous colorant, was prepared by techniques known in the inkjet art. A black pigment dispersion was used for the ink examples except where noted. The following ingredients were used as indicated to form the crosslinked polyurethanes used in the examples.

Ingredients and Abbreviations

BZMA=benzyl methacrylate
DBTL=dibutyltindilaurate
DMEA=dimethylethanolamine
DMIPA=dimethylisopropylamine DMPA=dimethylol propionic acid
EDA=ethylene diamine
ETEGMA=ethoxytriethylenglycolmethacrylate
HDI=1,6-hexamethylene diisocyanate
IPDA=isophoronediamine
IPDI=isophoronediisocyanate
MAA=methyl acrylic acid
POEA=2-phenoxyethyl acrylate ester
TEA=triethylamine
TETA=triethylenetetramine
THF=tetrahydrofuran Unless otherwise noted, the above chemicals were obtained from Aldrich (Milwaukee, Wis.) or other similar suppliers of laboratory chemicals.

Desmophene C 200—a polyester carbonate diol from Bayer (Pittsburgh, Pa.)

Surfynol® 440—a nonionic surfactant from Air Products (Allentown, Pa.)

Terathane® 1400—a polytetramethylene oxide polyol from Invista (Wilmington, Del.)

Extent of Polyurethane Reaction

The extent of polyurethane reaction was determined by detecting NCO % by dibutylamine titration, a common method in urethane chemistry. In this method, a sample of the NCO containing prepolymer is reacted with a known amount of dibutylamine solution and the residual amine is back titrated with HCl.

Particle Size Measurements

The particle size for the polyurethane dispersions, pigments and the inks were determined by dynamic light scattering using a Microtrac® UPA 150 analyzer from Honeywell/Microtrac (Montgomeryville Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution.

The reported numbers below are the volume average particle size.

Solid Content Measurement

Solid content for the solvent free or the aqueous crosslinked polyurethane dispersoids was measured with a moisture analyzer, model MA50 from Sartorius. For polyurethane dispersoid containing high boiling solvent, such as NMP, the solid content was then determined by the weight differences before and after baking in 150° C. oven for 180 minutes. It should be noted that a polyurethane which is dried in this manner to its solid cannot be easily redispersed and used.

THF Insolubles Measurement

THF insolubles content of the polyurethanes was measured by first mixing 1 gram of the polyurethane dispersoid with 30 grams of THF in a pre-weighed centrifuge tube. After the solution was centrifuged for 2 hours at 17,000 rpm, the top liquid layer was poured out and the non-dissolved gel in the bottom was left. The centrifuge tube with the non-dissolved gel was re-weighed after the tube was put in the oven and dried for 2 hours at 110° C.

% Micro-gel of polyurethane=((weight of tube and non-dissolved gel)−(weight of tube))/(sample weight*polyurethane solid %).

Test for Hydrolytic Stability of the Polyurethanes

A test for studying the hydrolytic stability of a polyurethane is to cast a film of the polyurethane from its dispersion, soak the film in water and then measure the increase in weight. The test is done with freshly prepared polyurethanes and polyurethanes that had been heat aged by putting the polyurethane dispersion in an oven at 70° C. for seven days. The weight increase, the water uptake, is compared for the fresh polyurethane and the aged material. If the polyurethane degrades under the aging conditions, that degradation can be attributed to the hydrolysis of some of the bonds in the polyurethane.

If the water uptake of film made from aged polyurethane is similar to the film from fresh polyurethane, then this indicates a relatively good hydrolytic stability; and, in turn, long term stability of the polyurethane dispersion or an ink jet ink made from the dispersion.

PUD Film Preparation 10-20 g of PUD resin was poured into a Petri dish lined with Teflon film. The resin was allowed to air dry for 48 hours first. Then it was baked in vacuum oven at 100° C. for 4 hours. The thickness of the dried film ranged from about 1 mm to 3.5 mm.

Water Up-Take Test 0.5 to 1.0 g of resin film was place in a 1 oz glass jar. The glass jar was filled with 30 g detergent water to cover the film. (1.5 g AATCC 3A wash detergent per liter water). The glass jar was then placed in oven at 70 C for 24 hours. Immediately after the glass jar was removed from the oven, the film was taken out, dried with a golf towel and weighed.

Water up-take %=(weight after water immersion−original weight)/original weight

Preparation of Inks

Inks used in the examples were made according to standard procedures in the inkjet art. Ingredient amounts are in weight percent of the final ink. Polyurethane dispersoid binders and colorants are quoted on a solids basis.

As an example of ink preparation, the ink vehicle was prepared and added with stirring to the aqueous dispersion polyurethane dispersoid binders. After stirring until a good dispersion was obtained, the mixture was then added to the pigment dispersion and stirred for another 3 hours, or until a good ink dispersion was obtained.

Preparation of Black Pigment Dispersion

A black dispersion was prepared by first mixing well the following ingredients: (i) 210.4 parts by weight (pbw) deionized water, (ii) 80.3 pbw of a 41.5 wt % (solids) anionic polymeric dispersant, and (iii) 9.24 pbw of dimethylethanolamine. The anionic polymer dispersant was a graft co-polymer 66.3/-g-4.2/29.5 POEA/-g-ETEGMA/MAA prepared according to " Preparation of Dispersant 1" from US20030128246, with the ratios of monomers adjusted to obtain the 66.2/4.2/29.5 instead of the 61.6/5.8/32.6 ratio indicated in the publication.

To this was gradually added 100 pbw black pigment (Nipex 180IQ, Degussa). After the pigment was incorporated, 100 pbw deionized water was mixed in to form the millbase, which was circulated through a media mill for grinding. 55.4 pbw deionized water was then added for dilution to final strength.

The resulting 15 wt % dispersion had the following properties: a viscosity of 8.60 cP (Brookfield viscometer, 20° C.), a pH of about 7.5 and a median particle size of 92 nm.

Crosslinked Polyurethane Dispersion,

Comparative Example 1

To a dry, alkali- and acid-free flask, equipped with an addition funnel, a condenser, stirrer and a nitrogen gas line was added 699.2 g Desmophene C 1200, a polyester carbonate diol (Bayer), 280.0 g acetone and 0.06 g DBTL. The contents were heated to 40° C. and mixed well. 189.14 g IPDI was then added to the flask via the addition funnel at 40° C. over 60 min, with any residual IPDI being rinsed from the addition funnel into the flask with 15.5 g acetone.

The flask temperature was raised to 50° C., held for 30 minutes then followed by 44.57 g DMPA, then followed by 25.2 g TEA, was added to the flask via the addition funnel, which was then rinsed with 15.5 g acetone. The flask temperature was then raised again to 50° C. and held at 50° C. until NCO % was 1.23% or less.

With the temperature at 50° C., 1498.0 g deionized (DI) water was added over 10 minutes, followed by mixture of 97.5 g EDA (as a 6.25% solution in water) and 29.7 g TETA (as a 6.25% solution in water) over 5 minutes, via the addition funnel, which was then rinsed with 80.0 g water. The mixture was held at 50° C. for 1 hr, then cooled to room temperature.

Acetone (~310.0 g) was removed under vacuum, leaving a final dispersion of polyurethane with about 35.0% solids by weight.

Crosslinked Polyurethane Dispersion

Comparative Example 2

To a dry, alkali- and acid-free flask, equipped with an addition funnel, a condenser, stirrer and a nitrogen gas line was added 349 g Formrez66-56, a 2000 MW poly (hexaneadipate) diol (Crompton), 140 g acetone and 0.06 g DBTL. The contents were heated to 40° C. and mixed well. Mixture of 87 g IPDI and 16 g Desmodur N3400 was then added to the flask via the addition funnel at 40° C. over 60 min, with any residual IPDI being rinsed from the addition funnel into the flask with 10 g acetone.

The flask temperature was raised to 50° C., held for 30 minutes then followed by 22.3 g DMPA, then followed by 12.8 g TEA, was added to the flask via the addition funnel, which was then rinsed with 6.7 g acetone. The flask temperature was then raised again to 50° C. and held at 50° C. until NCO % was 1.22% or less.

With the temperature at 50° C., 750 g deionized (DI) water was added over 10 minutes, followed by 90 g EDA (as a 6.25% solution in water) over 5 minutes, via the addition funnel, which was then rinsed with 40.0 g water. The mixture was held at 50° C. for 1 hr, then cooled to room temperature.

Acetone (~160 g) was removed under vacuum, leaving a final dispersion of polyurethane with about 35.0% solids by weight Crosslinked Polyurethane Dispersion Comparative Example 3

To a dry, alkali- and acid-free flask, equipped with an addition funnel, a condenser, stirrer and a nitrogen gas line was added 663.6 g Terathane 1400, a polyether diol (Invista), 280.0 g acetone and 0.06 g DBTL. The contents were heated to 40° C. and mixed well. 223.5 g IPDI was then added to the flask via the addition funnel at 40° C. over 60 min, with any residual IPDI being rinsed from the addition funnel into the flask with 15.5 g acetone.

The flask temperature was raised to 50° C., held for 30 minutes then followed by 44.5 g DMPA, then followed by 25.2 g TEA, was added to the flask via the addition funnel, which was then rinsed with 15.5 g acetone. The flask temperature was then raised again to 50° C. and held at 50° C. until NCO % was 1.23% or less.

With the temperature at 50° C., 1415 g deionized (DI) water was added over 10 minutes, followed by mixture of 26.2 g EDA (as a 6.25% solution in water) and 212.4 g TETA (as a 6.25% solution in water) over 5 minutes, via the addition funnel, which was then rinsed with 80.0 g water. The mixture was held at 50° C. for 1 hr, then cooled to room temperature.

Acetone (~310.0 g) was removed under vacuum, leaving a final dispersion of polyurethane with about 35.0% solids by weight.

Crosslinked Polyurethane Dispersion

Comparative Example 4

To a dry alkali- and acid-free flask, equipped with an addition funnel, a condenser, stirrer and a nitrogen gas line, was added 349.6 g of PCDL L6002, a polycarbonate diol, (Asahi Kasei), 140 g acetone and 0.04 g DBTL. The contents were heated to 40° C. and mixed well. 87 g IPDI, 16 g Desmodur N3400, a HDI 40 wt % dimer and 60 wt % trimer blend, (Bayer) were then charged to the flask via the addition funnel over 60 min, with any residual isocyanate being rinsed from the addition funnel into the flask with 10 g acetone.

The flask temperature was raised to 50° C. and held for 30 minutes. 22.3 g DMPA followed by 12.8 g TEA was then added to the flask via the addition funnel, which was then rinsed with 10 g of acetone. The flask temperature was held at 50° C. until NCO % was 1.25% or less.

With temperature at 50° C., 750.0 g DI water was added over 10 minutes, followed by 90 g EDA (as a 6.25% solution in water) over 5 minutes, via the addition funnel, which was then rinsed with 40.0 g of water. The mixture was then held at 50° C. for 1 hr, then cooled to room temperature.

Acetone (~160 g) was removed under vacuum, leaving a final dispersion of polyurethane with about 35% solids by weight.

Crosslinked Polyurethane Dispersion 1

To a dry, alkali- and acid-free flask, equipped with an addition funnel, a condenser, stirrer and a nitrogen gas line was added 655.3 g PCDL T6002, a polycarbonate diol (Asahi Kasei), 152.7 g Terathane 1400, a polyether diol (Invista), 326.6 g acetone and 0.08 g DBTL. The contents were heated to 40° C. and mixed well. 228.7 g IPDI was then added to the flask via the addition funnel at 40° C. over 60 min, with any residual IPDI being rinsed from the addition funnel into the flask with 18 g acetone.

The flask temperature was raised to 50° C., held for 30 minutes then followed by 52 g DMPA, then followed by 32 g DMIPA (dimethyl isopropyl amine), was added to the flask via the addition funnel, which was then rinsed with 18 g acetone. The flask temperature was then raised again to 50° C. and held at 50° C. until NCO % was 1.17% or less.

With the temperature at 50° C., 1750.5 g deionized (DI) water was added over 10 minutes, followed by mixture of 29 g EDA (as a 6.25% solution in water) and 139 g DETA (as a 6.25% solution in water) over 5 minutes, via the addition funnel, which was then rinsed with 80.0 g water. The mixture was held at 50° C. for 1 hr, then cooled to room temperature.

Acetone (~362.6 g) was removed under vacuum, leaving a final dispersion of polyurethane with about 35.0% solids by weight.

Crosslinked Polyurethane Dispersion 2

To a dry, alkali- and acid-free flask, equipped with an addition funnel, a condenser, stirrer and a nitrogen gas line was added 718.9 g PCDL T6002, a polycarbonate diol (Asahi Kasei), 90.4 g Terathane 1400, a polyether diol (Invista), 326.6 g acetone and 0.08 g DBTL. The contents were heated to 40° C. and mixed well. 226.9 g IPDI was then added to the flask via the addition funnel at 40° C. over 60 min, with any residual IPDI being rinsed from the addition funnel into the flask with 18 g acetone.

The flask temperature was raised to 50° C., held for 30 minutes then followed by 52 g DMPA, then followed by 27 g DMIPA (dimethyl isopropyl amine), was added to the flask via the addition funnel, which was then rinsed with 18 g acetone. The flask temperature was then raised again to 50° C. and held at 50° C. until NCO % was 1.17% or less.

With the temperature at 50° C., 1719.4 g deionized (DI) water was added over 10 minutes, followed by mixture of 29 g EDA (as a 6.25% solution in water) and 141 g TETA (as a 10.4% solution in water) over 5 minutes, via the addition funnel, which was then rinsed with 80.0 g water. The mixture was held at 50° C. for 1 hr, then cooled to room temperature.

Acetone (−362.6 g) was removed under vacuum, leaving a final dispersion of polyurethane with about 35.0% solids by weight.

Crosslinked Polyurethane Dispersion 3

To a dry, alkali- and acid-free flask, equipped with an addition funnel, a condenser, stirrer and a nitrogen gas line was added 715 g PCDL T6002, a polycarbonate diol (Asahi Kasei), 78.8 g Terathane 650, a polyether diol (Invista), 326.3 g acetone and 0.08 g DBTL. The contents were heated to 40° C. and mixed well. 241.9 g IPDI was then added to the flask via the addition funnel at 40° C. over 60 min, with any residual IPDI being rinsed from the addition funnel into the flask with 18 g acetone.

The flask temperature was raised to 50° C., held for 30 minutes then followed by 52 g DMPA, then followed by 27 g DMIPA (dimethyl isopropyl amine), was added to the flask via the addition funnel, which was then rinsed with 18 g acetone. The flask temperature was then raised again to 50° C. and held at 50° C. until NCO % was 1.24% or less.

With the temperature at 50° C., 1719.4 g deionized (DI) water was added over 10 minutes, followed by mixture of 30.8 g EDA (as a 6.25% solution in water) and 150 g TETA (as a 10.4% solution in water) over 5 minutes, via the addition funnel, which was then rinsed with 80.0 g water. The mixture was held at 50° C. for 1 hr, then cooled to room temperature.

Acetone (−362.3 g) was removed under vacuum, leaving a final dispersion of polyurethane with about 35.0% solids by weight.

Crosslinked Polyurethane Dispersion 4

To a dry, alkali- and acid-free flask, equipped with an addition funnel, a condenser, stirrer and a nitrogen gas line was added 301.7 g Sovermol 920, a polyether carbonate diol, (Cognis), 121.3 g acetone and 0.06 g DBTL. The contents were heated to 40° C. and mixed well. 83.7 g IPDI was then added to the flask via the addition funnel at 40° C. over 60 min, with any residual IPDI being rinsed from the addition funnel into the flask with 6.7 g acetone.

The flask temperature was raised to 50° C., held for 30 minutes then followed by 19.3 g DMPA, then followed by 10.9 g TEA, was added to the flask via the addition funnel, which was then rinsed with 6.7 g acetone. The flask temperature was then raised again to 50° C. and held at 50° C. until NCO % was 1.05% or less.

With the temperature at 50° C., 652 g deionized (DI) water was added over 10 minutes, followed by mixture of 10.8 g EDA (as a 6.25% solution in water) and 52.5 g TETA (as a 6.25% solution in water) over 5 minutes, via the addition funnel, which was then rinsed with 80.0 g water. The mixture was held at 50° C. for 1 hr, then cooled to room temperature.

Acetone (−134.7 g) was removed under vacuum, leaving a final dispersion of polyurethane with about 35.0% solids by weight.

Crosslinked Polyurethane Dispersion 5a ($Z_2$ and $Z_3$ Diols Only)

To a dry, alkali- and acid-free flask, equipped with an addition funnel, a condenser, stirrer and a nitrogen gas line was added 815.8 g PCDL T6002, a polycarbonate diol (Asahi Kasei), 326.5 g acetone and 0.08 g DBTL. The contents were heated to 40° C. and mixed well. 220.67 g IPDI was then added to the flask via the addition funnel at 40° C. over 60 min, with any residual IPDI being rinsed from the addition funnel into the flask with 18 g acetone.

The flask temperature was raised to 50° C., held for 30 minutes then followed by 52 g DMPA, then followed by 31.3 g TEA was added to the flask via the addition funnel, which was then rinsed with 18 g acetone. The flask temperature was then raised again to 50° C. and held at 50° C. until NCO % was 1.13% or less. With the temperature at 50° C., 1754 g deionized (DI) water was added over 10 minutes, followed by mixture of 29.2 g EDA (as a 6.25% solution in water) and 120.7 g DETA (as a 6.25% solution in water) over 5 minutes, via the addition funnel, which was then rinsed with 80.0 g water. The mixture was held at 50° C. for 1 hr, then cooled to room temperature.

Acetone (−362.5 g) was removed under vacuum, leaving a final dispersion of polyurethane with about 35.0% solids by weight.

Crosslinked Polyurethane Dispersion 5b ($Z_1$ and $Z_2$ Diols Only)

To a dry, alkali- and acid-free flask, equipped with an addition funnel, a condenser, stirrer and a nitrogen gas line was added 774.2 g Terathane 1400, a polyether diol (Invista), 326.1 g acetone and 0.08 g DBTL. The contents were heated to 40° C. and mixed well. 260.7 g IPDI was then added to the flask via the addition funnel at 40° C. over 60 min, with any residual IPDI being rinsed from the addition funnel into the flask with 18 g acetone.

The flask temperature was raised to 50° C., held for 30 minutes then followed by 52 g DMPA, then followed by 31.3 g TEA was added to the flask via the addition funnel, which was then rinsed with 18 g acetone. The flask temperature was then raised again to 50° C. and held at 50° C. until NCO % was 1.33% or less.

With the temperature at 50° C., 1717.8 g deionized (DI) water was added over 10 minutes, followed by mixture of 36 g EDA (as a 6.25% solution in water) and 148.9 g DETA (as a 6.25% solution in water) over 5 minutes, via the addition funnel, which was then rinsed with 80.0 g water. The mixture was held at 50° C. for 1 hr, then cooled to room temperature.

Acetone (−362.1 g) was removed under vacuum, leaving a final dispersion of polyurethane with about 35.0% solids by weight.

Crosslinked Polyurethane Dispersion 6b ($Z_2$ and $Z_3$ Diols Only)

To a dry, alkali- and acid-free flask, equipped with an addition funnel, a condenser, stirrer and a nitrogen gas line was added 220.0 g Tego BD1000, a 1000 MW butylmethacrylate diol, (Degussa), 108 g acetone and 0.06 g DBTL. The contents were heated to 40° C. and mixed well. Mixture 87 g IPDI and 16 g Desmodur N3400 was then added to the flask via the addition funnel at 40° C. over 60 min, with any residual being rinsed from the addition funnel into the flask with 10 g acetone. The flask temperature was raised to 50° C., held for 30 minutes then followed by 18 g DMPA, then followed by 10 g TEA, was added to the flask via the addition funnel, which was then rinsed with 10 g acetone. The flask temperature was then raised again to 50° C. and held at 50° C. until NCO % was 1.35% or less.

With the temperature at 50° C., 588 g deionized (DI) water was added over 10 minutes, followed by 74.9 g EDA (as a 6.25% solution in water) over 5 minutes, via the addition funnel, which was then rinsed with 80.0 g water. The mixture was held at 50° C. for 1 hr, then cooled to room temperature.

Acetone (~128 g) was removed under vacuum, leaving a final dispersion of polyurethane with about 35.0% solids by weight.

Water Up-take testing of Polyurethanes

Films of freshly made polyurethanes and heat aged were made and tested in the water up-take test. The test results are reported in Table 1 below.

TABLE 1

Water Up-take Test

| | Water up-take % for film prepared from fresh made dispersions | Water-up-take % for Film prepared after dispersion aged at 70 C. for 7 days | % change |
|---|---|---|---|
| Comparative Ex 1 | 70% | 150% | 114% |
| Comparative Ex 2 | 70% | Film dissolved | NA |
| Comparative Ex 3 | 110% | 200% | 82% |
| Comparative Ex 4 | 45% | 65% | 45% |
| PUD EX6b (Comp EX 5)(1) | 42% | 65% | 54% |
| PUD EX1 | 56% | 86% | 53% |
| PUD EX2 | 50% | 75% | 50% |
| PUD EX3 | 112% | 116% | 3.6% |
| PUD EX4 | 82% | 92% | 12% |

(1) When PUD example 6b is used alone it is a comparative example since it has a PUD with only $Z_2$ and $Z_3$.

The Comparative Example 1 showed dramatic water uptake increase between the film cast from the fresh polyurethane and the aged polyurethane. Comparative Example 2 showed an high water uptake and after the corresponding polyurethane dispersion was heat aged and cast as a film the film was soluble in the water. Comparative Example 3 showed high water uptake and poor wash fastness (Table 3). Comparative Example 4 and 5 while showing adequate water uptake for both the freshly made and the aged material displayed other poorer printing attributes, including a poor crock, poor hand of the printed textile when compared to the inventive examples, This inventive inks took up less water suggesting that there stability to water is better.

Black inks were made with the comparative and the inventive crosslinked polyurethane dispersoids. The black dispersion was previously described and has 4.25% black dispersion in each ink. These inks were printed onto 419 Cotton and tested for washfastness and Crock by the AATC method.

TABLE 2

Black ink Formulations

| | Comp ink A | Comp ink B | Comp ink C | A | B | C | D | E | F |
|---|---|---|---|---|---|---|---|---|---|
| Comp PUD 1 | 9% | | | | | | | | |
| Comp PUD 3 | | 8% | | | | | | | |
| Comp PUD 4 | | | 13% | | | | | | |
| PUD EX1 | | | | 9% | | | | | |
| PUD EX2 | | | | | 9% | | | | |
| PUD EX3 | | | | | | 9% | | | |
| PUD EX4 | | | | | | | 13% | | |
| PUD EX5A | | | | | | | | 7.20% | 8.10% |
| PUD EX5B | | | | | | | | 1.80% | 0.90% |
| Glycerol | 18% | 18% | 8% | 18% | 18% | 18% | 8% | 18% | 18% |
| Ethylene Glycol | 12% | 12% | 12% | 12% | 12% | 12% | 12% | 12% | 12% |
| Surfynol 440 | 1.00% | 1.00% | | 1.00% | 1.00% | 1.00% | | 1.00% | 1.00% |
| Surfynol 104E | | | 0.15% | | | | 0.15% | | |
| Silwet L77 | | | 0.15% | | | | 0.15% | | |
| Water (to 100%) | Bal | Bal | Bal | Bal | Bal | Bal | Bal | Bal | Bal |
| Viscosity (cps) | 7.4 | 7.73 | 7.95 | 8.68 | 10 | 8.2 | 7.55 | 8 | 7.8 |

TABLE 3

Crock and wash fastness results for black ink examples

| | Ink example | | | | | | | | |
|---|---|---|---|---|---|---|---|---|---|
| | Comp Ink 1 | Comp Ink 2 | Comp Ink 3 | A | B | C | D | E | F |
| Dry crock | 4.5 | 4 | 3.5 | 4.5 | 4.5 | 4.5 | 4.5 | 4.5 | 4.5 |
| Wet crock | 2.5 | 2.5 | 2 | 2.5 | 3 | 3 | 2.5 | 3 | 2.5 |
| 3A washfastness | 4.5 | 2.5 | 4.5 | 4.5 | 5 | 4.5 | 4 | 4.5 | 4 |

In initial tests the comparative ink and the inventive examples have comparable washfastness and crock.

The Comparative Ink 1 and Inventive Examples A, B and C were stored in a heated oven at 50° C. for 12 weeks or 40° C. for 16 weeks and then printed on cotton and tested for crock and wash fastness.

TABLE 4

Washfastness results for oven aged black ink

| | Ink example | | | |
|---|---|---|---|---|
| | Comp Ink 1 | A | B | C |
| Initial 3A washfasness | 4.0 | 4.5 | 5.0 | 4.5 |
| 3A washfasness after ink stored at 50° C. 12 weeks | 1.0 | 3.5 | 4.5 | 4.5 |
| 3A washfasness after ink stored at 40° C. 16 weeks 40° C. | 2.5 | 4.5 | 4.5 | 4.0 |

The inventive inks are superior to the Comparable Ink. Even under these modest storage conditions that inks might experience commercially, the inventive inks did not exhibit any degradation based on these tests. While not being bound by theory, the inventive inks appear to be stable to hydrolysis conditions that would exist in an aqueous ink jet ink.

A further confirmation of the degradation of the crosslinked polyurethane dispersoids is the measure of the loss of the microgels content as measured by the THF solubles test.

TABLE 5

Micro-gel content results for oven aged binder

| | Comparative PUD Ex 1 | PUD Ex 1 | PUD Ex 2 | PUD Ex 3C |
|---|---|---|---|---|
| Initial Microgel % | 4.3% | 3.1% | 6.5% | 10.1% |
| Microgel % after binder stored at 50° C. 6 weeks | 1.3% | 2.3% | 4.1% | 8.1% |
| % drop | 70% | 26% | 36% | 19.8% |

The comparative crosslinked polyurethane dispersoid loses a substantially amount of the microgels after heat aging. While not being bound by theory, the inventive inks appear to be more stable in the test.

Colored inks were prepared using the following formulation with PUD EX 1 These were printed Ink was printed with a Artistri® 2020 printer on 419 100% cotton.

TABLE 6

Colored Ink Formulation

| | Ink Color | | | |
|---|---|---|---|---|
| | Cyan | Magenta | Yellow | Blue |
| Cyan dispersion (% pigment) | 3.0% | | | |
| Magenta dispersion (% pigment) | | 4.25% | | |
| Yellow dispersion (% pigment) | | | 4.25% | |
| Blue dispersion (% pigment) | | | | 3.0% |
| Orange dispersion (% pigment) | | | | |
| PUD EX 1 | 7.0% | 7.5% | 7.5% | 7.5% |
| Dipropylene Glycol Methyl Ether | 5% | 2% | 3% | 3% |
| Glycerol | 27% | 18% | 22% | 18% |
| Ethylene Glycol | 8% | 8% | 8% | 8% |
| Surfynol 440 | 1.0% | 1.0% | 1.0% | 1.0% |
| Water (to 100%) | Balance | Balance | Balance | Balance |

TABLE 7

Crock and washfastness results of colored inks

| Ink Example | Binder | Dry crock | Wet crock | 3A washfastness |
|---|---|---|---|---|
| Cyan Ink I | Comp | 4.0 | 3.0 | 3.5 |
| Cyan Ink J | PUD EX1 | 4.5 | 3.5 | 4.0 |
| Magenta Ink K | Comp | 4.0 | 3.0 | 3.0 |
| Magenta Ink L | PUD EX1 | 4.5 | 3.0 | 3.0 |
| Yellow Ink M | Comp | 3.5 | 3.0 | 4.5 |
| Yellow Ink N | PUD EX1 | 4.0 | 3.5 | 4.0 |
| Blue Ink O | Comp | 4.5 | 3.0 | 2.5 |
| Blue Ink P | PUD EX1 | 4.5 | 3.5 | 2.5 |

The inventive inks produced at least comparable print test results. These were tested as prepared and were not aged.

Samples of inventive black Ink were printed with an EPSON3000 printer on Hammermill Copy Plus (HCP) paper and Xerox 4024 paper. To determine waterfastness, a pattern consisting of five 4 mm-wide parallel stripes spaced 7 mm apart is printed at 720 dpi. Holding the paper at an incline of about 45 degrees, two drops of water—one on top of the other—are allowed to drip across the five printed stripes. This process is carried out on different parts of the test pattern at 30 sec, 1 minute and 5 minutes after printing. The stripes are rated OK if no indication of ink running.

TABLE 8

Ink composition

| | Ink | |
|---|---|---|
| | Q | R |
| Black SDP (% pigment) | 6.0% | 6.0% |
| Comp binder | 1.0% | |
| Crosslinked Polyurethane Dispersoid EX1 | | 1.0% |
| Glycerol | 18% | 18% |
| Ethylene Glycol | 8% | 8% |
| Surfynol 440 | 1.0% | 1.0% |
| Water (to 100%) | Balance | Balance |

TABLE 9

| | Waterfastness results | | | | | |
|---|---|---|---|---|---|---|
| Ink | HCP 30 sec | HCP 1 min | HCP 5 min | Xerox 4024 30 sec | Xerox 4024 1 min | Xerox 4024 5 min |
| Ink Q | OK | OK | OK | OK | OK | OK |
| Ink R | OK | OK | OK | OK | OK | OK |

The inventive inks passed this water fastness test for paper.

The invention claimed is:

1. An inkjet ink composition comprising an aqueous vehicle having a colorant and a first crosslinked polyurethane dispersoid, wherein the ink comprises the crosslinked polyurethane dispersoid in an amount of more than about 0.5% to about 30% by weight, based on the total weight of the ink, and wherein the amount of crosslinking in the crosslinked polyurethane is greater than about 1% and less than about 50 wt % as measured by the THF insolubles test and where the crosslinked polyurethane is formed from at least a first diol, $Z_1$ a second diol, $Z_2$ and a third diol $Z_3$ and where

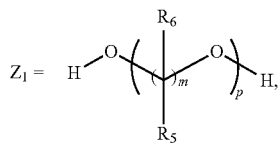

I p greater than or equal to 2,
and m greater than or equal to 3 to about 36;
$R_5$, $R_6$=hydrogen, alkyl, substituted alkyl, aryl; where the $R_5$ or $R_6$ are the same or different for each substituted methylene group and where $R_5$ and $R_5$ or $R_6$ can be joined to form a cyclic structure;
$Z_2$ is a diol substituted with an ionic group;
$Z_3$ is selected from the group consisting of polycarbonate diols, polyamide diols and poly(meth)acrylate diols;
and where the colorant is selected from pigments and dyes or combinations of pigments and dyes.

2. The inkjet ink composition of claim 1, having a surface tension in the range of about 20 dyne/cm to about 70 dyne/cm, and a viscosity in the range of about 1 cP to about 30 cP at 25° C.

3. The inkjet ink composition of claim 1, wherein the colorant comprises a pigment.

4. The inkjet ink composition of claim 1, wherein the first crosslinked polyurethane comprises diols $Z_1$ $Z_2$ and $Z_3$ and $Z_3$ is a polycarbonate diol.

5. The inkjet composition of claim 1, wherein the first crosslinked polyurethane is formed from diols $Z_1$, $Z_2$ and $Z_3$ and the mole ratio of diols $Z_1$, and $Z_3$ is about 1:1 to about 1:10.

6. The inkjet composition of claim 1, wherein the first crosslinked polyurethane is formed from diols $Z_1$, $Z_2$ and $Z_3$ and the mole ratio of diols $Z_1$, and $Z_3$ is about 1:1.5 to about 1:7.

7. An inkjet ink composition comprising an aqueous vehicle having a colorant and a second crosslinked polyurethane dispersoid and a third crosslinked polyurethane dispersoid, wherein the ink comprises the second crosslinked polyurethane dispersoid in an amount of more than about 0.25% to about 30% by weight based on the total weight of the ink, and the third crosslinked polyurethane dispersoid in an amount of more than about 0.5% to about 30% by weight based on the total weight of the ink wherein the amount of crosslinking in the second crosslinked polyurethane is greater than about 1% and less than about 50 wt % as measured by the THF insolubles test and the amount of crosslinking in the third crosslinked polyurethane is greater than about 1% and less than about 50 wt % as measured by the THF insolubles test where the second crosslinked polyurethane is formed from at least a first diol, $Z_1$ and a second diol, $Z_2$ and the third crosslinked polyurethane is formed from at least a second diol, $Z_2$ and a third diol, $Z_3$ and
where

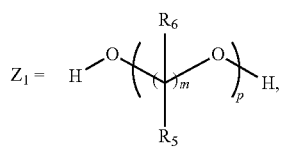

I p greater than or equal to 2,
and m greater than or equal to 3 to about 36;
$R_5$, $R_6$=hydrogen, alkyl, substituted alkyl, aryl; where the $R_5$ or $R_6$ are the same or different for each substituted methylene group and where $R_5$ and $R_5$ or $R_6$ can be joined to form a cyclic structure;
$Z_2$ is a diol substituted with an ionic group;
$Z_3$ is selected from the group consisting of polycarbonate diols, polyamide diols and poly(meth)acrylate diols;
and where the colorant is selected from pigments or dyes or combinations of pigments and dyes.

8. A method for inkjet printing onto a substrate, comprising the steps of:
(a) providing an inkjet printer that is responsive to digital data signals;
(b) loading the printer with a substrate to be printed;
(c) loading the printer with an ink as set forth in any one of claims 1 and 2; and
(d) printing onto the substrate using the ink or inkjet ink set in response to the digital data signals.

9. The method of claim 8, wherein the substrate is a textile.

10. The method of claim 9, wherein the printed substrate is post treated with a combination of heat and pressure.

11. The inkjet ink composition of claim 2, having a surface tension in the range of about 20 dyne/cm to about 70 dyne/cm, and a viscosity is in the range of about 1 cP to about 30 cP at 25° C.

12. The inkjet ink composition of claim 2, wherein the colorant comprises a pigment.

13. The inkjet ink composition of claim 2, wherein the third crosslinked polyurethane is formed from diols $Z_2$ and $Z_3$ and $Z_3$ is a polycarbonate diol.

14. The inkjet composition of claim 2, wherein the second and third crosslinked polyurethanes are formed from diols $Z_1$ and, $Z_2$ and $Z_2$ and $Z_3$ respectively and the mole ratio of diols $Z_1$, and $Z_3$ is about 1:1 to about 1:10.

15. The inkjet composition of claim 2, wherein the second and third crosslinked polyurethanes are formed from diols $Z_1$ and $Z_2$ and $Z_2$ and $Z_3$ respectively and the mole ratio of diols $Z_1$, and $Z_3$ is about 1:1.5 to about 1:7.

* * * * *